(12) United States Patent
Sherman et al.

(10) Patent No.: US 8,007,236 B2
(45) Date of Patent: Aug. 30, 2011

(54) SUPPORTING SYSTEM FOR SUSPENDED WIND TURBINES

(76) Inventors: Yury Sherman, Roslindale, MA (US); Mark Yankelevich, Brooklyn, NY (US)

( * ) Notice: Subject to any disclaimer, the term of this patent is extended or adjusted under 35 U.S.C. 154(b) by 594 days.

(21) Appl. No.: 12/284,520

(22) Filed: Sep. 24, 2008

(65) Prior Publication Data

US 2010/0074760 A1 Mar. 25, 2010

(51) Int. Cl.
*F01D 5/18* (2006.01)

(52) U.S. Cl. ......... 416/85; 416/86; 416/142; 416/196 A; 416/226; 416/244 R

(58) Field of Classification Search .................... 416/11, 416/85, 86, 132 B, 139, 141, 142, 147, 196 A, 416/226, 241 A, 244 R
See application file for complete search history.

(56) References Cited

U.S. PATENT DOCUMENTS

| 3,139,021 | A  | * | 6/1964  | Miles ............................. 454/182 |
| 4,083,651 | A  | * | 4/1978  | Cheney et al. .................. 416/11 |
| 4,417,853 | A  | * | 11/1983 | Cook ......................... 416/132 B |
| 4,491,739 | A  | * | 1/1985  | Watson ......................... 290/44 |
| 6,629,815 | B2 | * | 10/2003 | Lusk ............................. 415/4.2 |
| 2003/0030283 | A1 | * | 2/2003 | Lusk ............................. 290/44 |
| 2006/0062676 | A1 | * | 3/2006 | Jakubowski et al. ..... 416/244 R |
| 2009/0044482 | A1 | * | 2/2009 | Tooman ......................... 52/699 |
| 2010/0150663 | A1 | * | 6/2010 | Torres Martinez ........... 405/222 |
| 2010/0266407 | A1 | * | 10/2010 | Barber ............................. 416/85 |
| 2011/0068729 | A1 | * | 3/2011  | Barber ......................... 318/538 |
| 2011/0107953 | A1 | * | 5/2011  | Jahnig ........................... 114/264 |

* cited by examiner

*Primary Examiner* — Michael Lebentritt

(57) ABSTRACT

In a preferred embodiment, a supporting system for suspended wind turbines placed in mountainous areas and cliff seashores. The system includes: substantially vertical support the turbine is attached to and a turbine coupled using a mechanism allowing a full-circle rotation of the turbine around the support. A carrying cable stretched over the ground carries downward vertical loads applied to the system, and a number of guy ropes, placed angularly to each other, carry applied wind loads. In the second and the third versions of the invention it is disclosed modifications of the main structural system for supporting vertical-axis wind turbines and the turbines placed in cliff seashore.

9 Claims, 7 Drawing Sheets

SUPPORTING SYSTEM FOR SUSPENDED WIND TURBINES

TECHNICAL FIELD OF THE INVENTION

The present invention relates to supporting structures generally and, more particularly, to a supporting structure for installations, such as wind turbines, in suspended position.

BACKGROUND OF THE INVENTION

Towers, which are the main type of wind turbine supports currently used, have several drawbacks. The wind power energy production is most effective in areas with strong and dependable winds. Mountainous and rocky areas, such as gaps, passes, gorges, cliff seashores, etc., of specific topographic and meteorological features, are especially prospective. However, towers are not acceptable for such areas: the costs of the towers, and associated construction works, and wind turbine maintenance are very high, which makes energy production ineffective. At now, wind turbines are usually sited at relatively plane terrain even where local winds are of much less power. Then, effectiveness of wind energy production depends on elevation of the turbines above the ground: the higher the stronger winds can be captured. In current practice, base on cost-effectiveness of tower supports, wind turbines are installed not higher than 70-75 m. above the ground, even though such heights are usually out of strong and dependable winds zones.

Several attempts to overcome the above drawbacks were undertaken by placing turbines in mountainous terrain, using suspended supports. One of the attempts was to exploit of structural principles developed for system of suspended supports for aerial transportation means (U.S. Pat. Nos. 5,655, 457 and 6,665,641). As it is disclosed in the Patents, the system included a long-span cable placed along the transportation route. One of its ends is anchored and another is attached to tensioning means. Rigid elements spaced apart, supporting the transportation means are carried by the cable and connected to upper ends of substantially vertical, slightly angled guy ropes. The guy ropes' lower ends are anchored in the ground. The cable carries vertical loads, mostly weight of installations, and the guy ropes carry lateral loads generated by winds.

Being effective for aerial transportation means the system, however, is unable to meet some of the requirements for carrying wind turbines, the most important of which is providing full-circle rotation of turbines about their supports.

SUMMARY OF THE INVENTION

Accordingly, an objects of the present invention is a structural system providing support for suspended wind turbines, including providing their lateral rigidity and full circle rotation as the direction of wind is changed. In the first version of the preferred embodiment it is considered the system supporting wind turbines having horizontal axes. The turbine installation consists on two main elements: substantially vertical support the turbine is attached to and a turbine. A broadly used gear mechanism coupling the support and the turbine, allows a full-circle rotation of the turbine around the support. A carrying cable, which one end is anchored and another is attached to tensioning means, pulls upward the wind turbine support at force of magnitude great enough for carrying downward vertical loads generated by the installation. A number of guy ropes, placed angularly to each other, having upper ends attached (directly or indirectly) to the turbine support at their upper ends, and lower ends anchored, provide lateral rigidity of the installation. In the second and the third versions of the preferred embodiment of the invention it is disclosed modifications of the main structural system for supporting suspended wind turbine with vertical-axis and the turbines placed in cliff seashore.

BRIEF DESCRIPTION

A description of the invention is made on example of supporting system for wind turbine suspended highly above deep depression in mountainous terrain.

Figure 1:
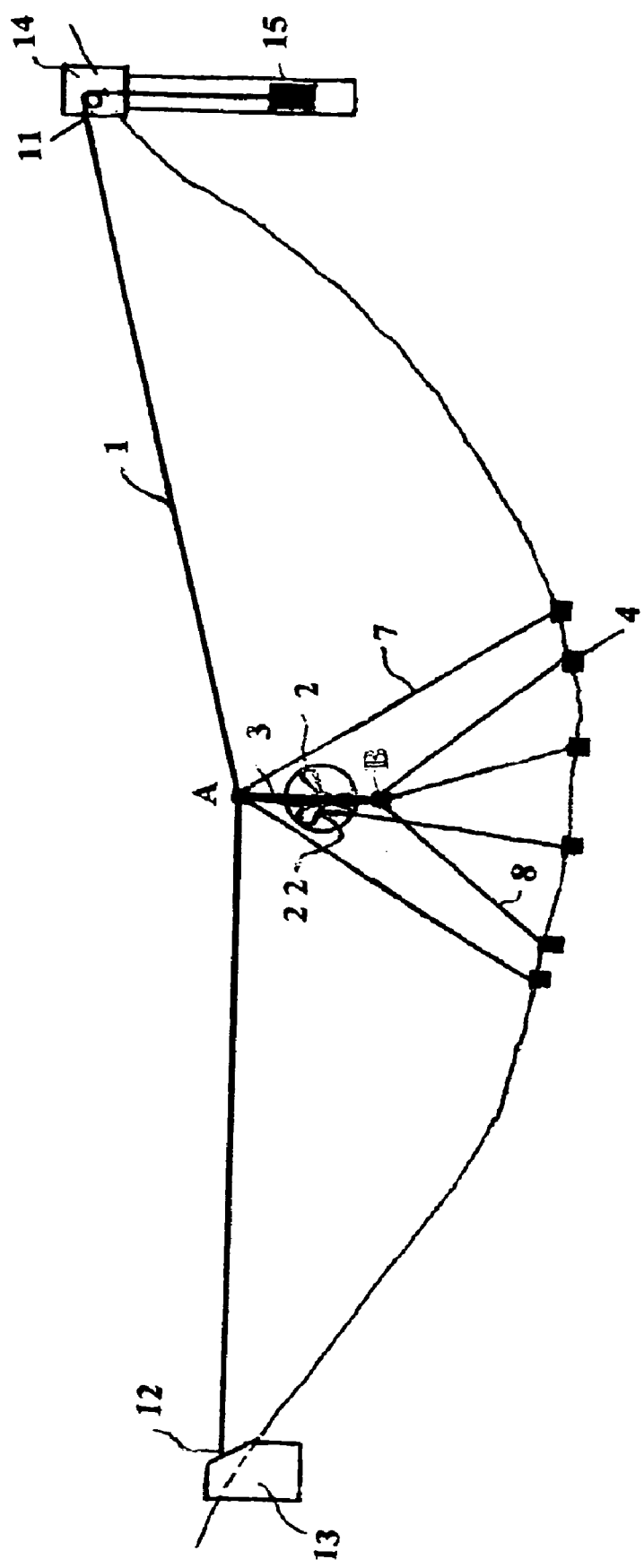
FIG. 1 is a front view of a structural system for supporting a horizontal-axis wind turbine suspended above deep depression.

Referring to the drawings in more detail, in FIG. 1 a wind turbine installation, including horizontal-axis turbine 2 and its support 3, suspended above the ground is shown.

The main carrying element of the supporting system is cable 1 suspended above the ground. End 12 of cable 1 is anchored in supporting station 13 and end 11 is attached to a tensioning means 15 of a supporting station 14. For tensioning the cable different pulling mechanisms can be used, for example, a balance weight 15 as it is schematically shown in FIG. 1. As a version, both ends of the cable can be anchored.

Vertical support 3, tubular in the preferred embodiment, supporting wind turbine 2, is hung from the cable. A known means for coupling wind turbines and their supports, providing a full-circle rotation of the turbine around the support as winds change their directions, for example gear system, can be used. As one of the measures preventing interference of wind turbine rotor with cable 1 when the turbine rotates about support 3, the turbine should be placed below middle point of support 3.

The upper end A of support 3 is hung from the cable and attached to guy ropes 7 and it's lower end B is connected to guy ropes 8. Support 3 is a member capable to sag under the wind loads. The sagging reduces dynamic forces applied to the system due to displacements of the turbine when it works.

Figure 2:
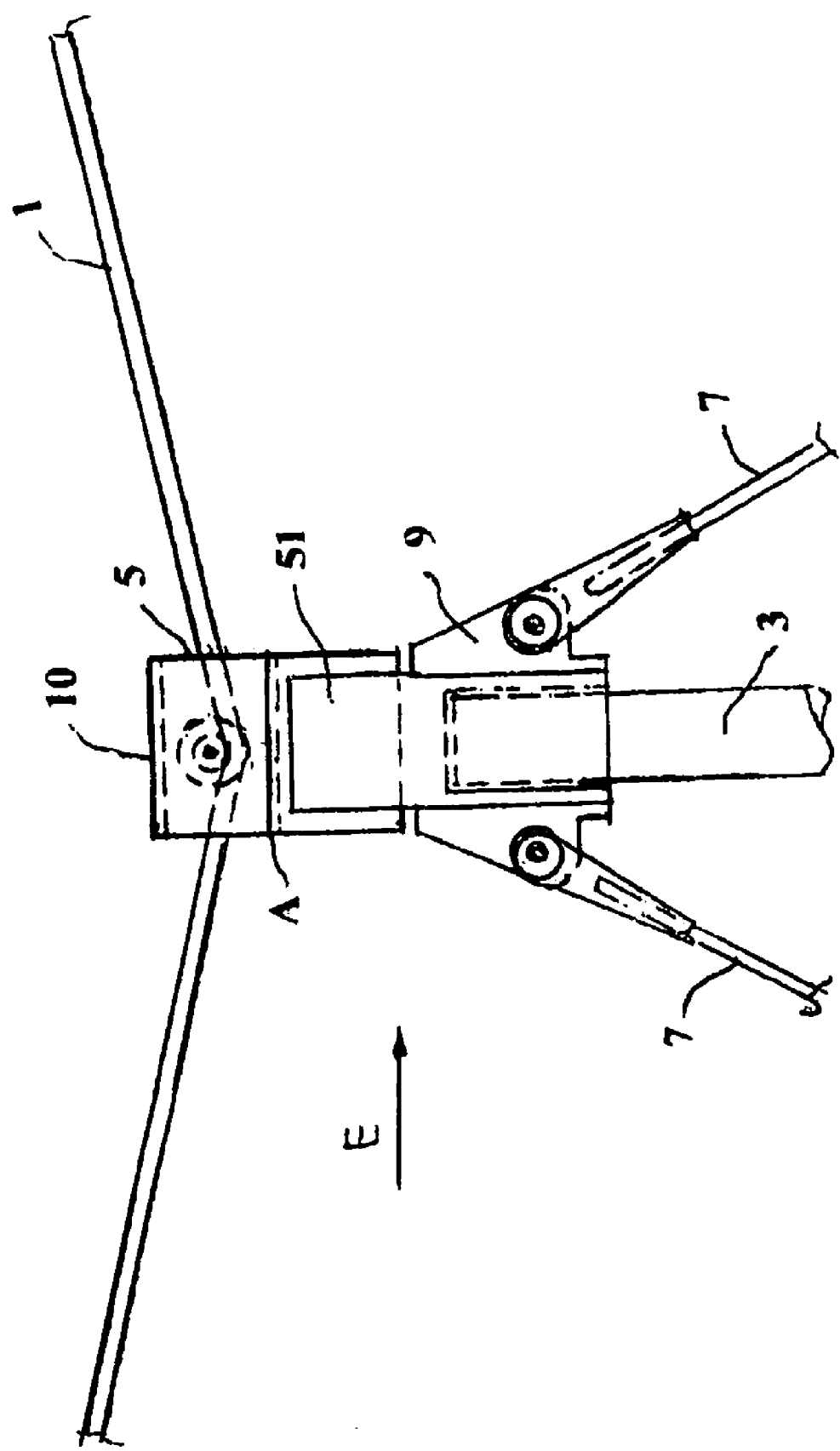
FIG. 2 is a front view of a turbine support at end A of FIG. 1, connecting the support with a cable and guy ropes.
Figure 3:
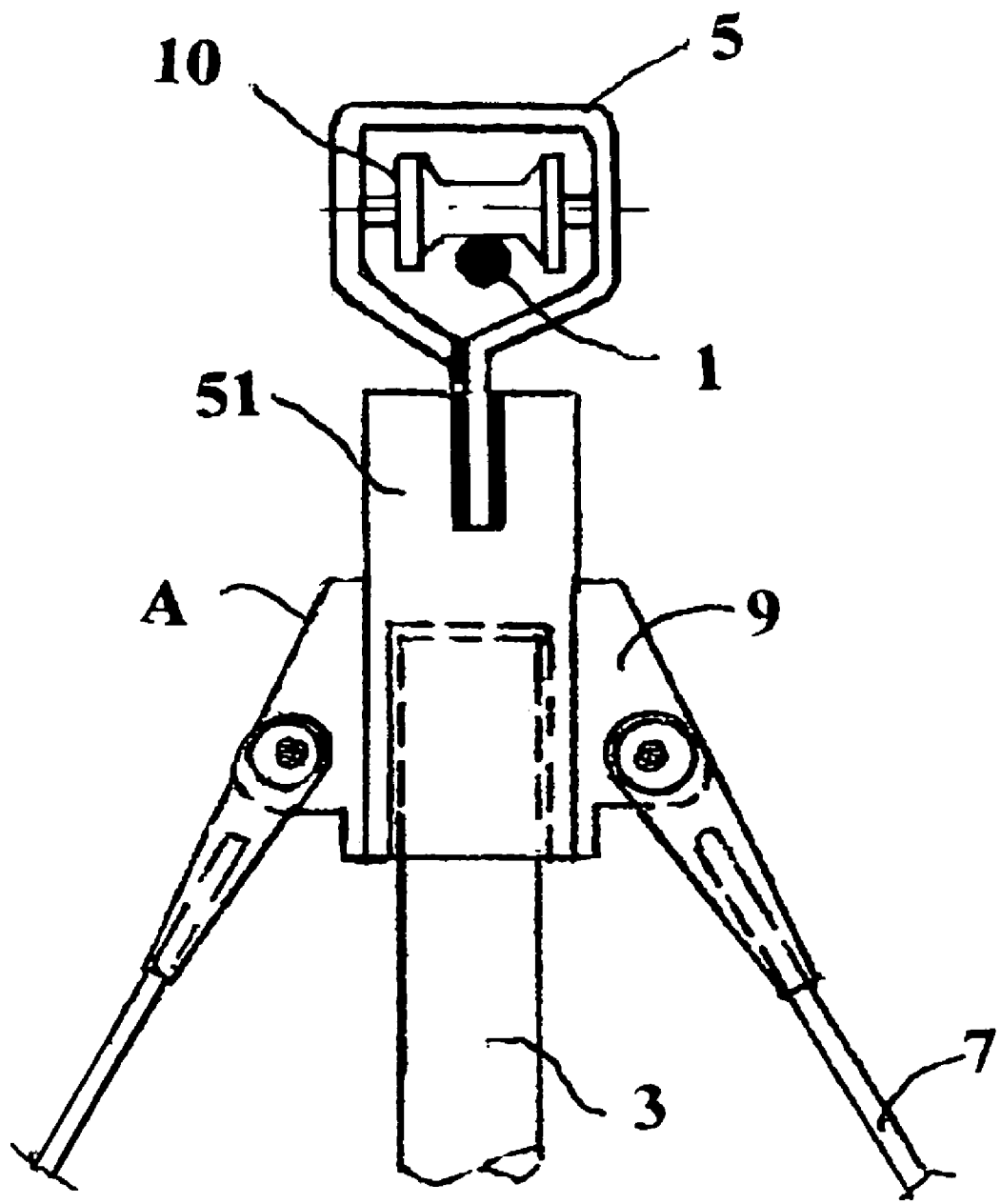
FIG. 3 is a view of a wind turbine supporting saddle of FIG. 2 along E.

The supporting system includes saddle 5 (FIGS. 2 and 3) placed at end A of support 3, set upon cable 1. Saddle 5 transfers weight of the turbine installation (a turbine+a support) and pre-tension forces in guy ropes 7 (see below)–to cable 1. In the preferred embodiment, saddle 5 includes sleeve 51 embracing tabular support 3 at its end A. The sleeve is affixed to support 3 by bolts. The saddle includes also extended part 9 suitable for attachment of guy ropes 7. Member 10 of the saddle provides embracing of cable 1 by saddle 5.

Figure 4:
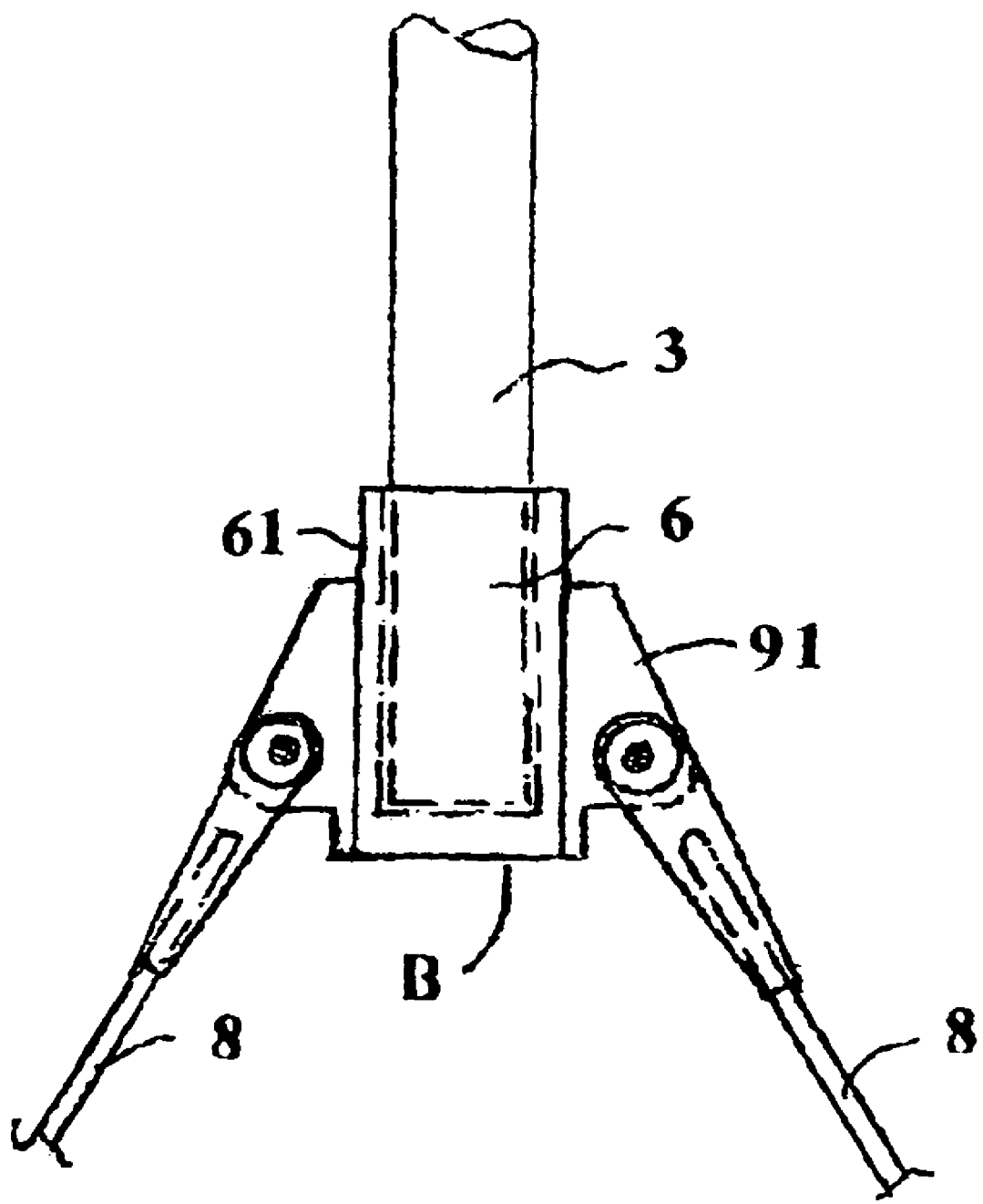
FIG. 4 is a front view of a turbine support at end B of FIG. 1, connecting the turbine support with guy ropes.

Support 6 placed at lower point B of support 3 (FIG. 4) is similar generally to saddle 5. The main function of support 6 is transference of the horizontal loads applied to the turbine installation at point B to guy ropes 8. Support 6 includes sleeve 61 embracing tabular support 3 at its bottom B. Support 6 has extended parts 91 suitable for attachment of guy ropes 8.

Guy ropes 7 and 8 transfer the horizontal loads applied to the turbine installation to the ground or special supporting structure. In the preferred embodiment supports 7 and 8 include three guy ropes which lower ends are anchored in footings 4 (FIG. 1). To reduce deflections of the wind turbine, guy ropes 7 and 8 are pre-tensioned.

Figure 5:
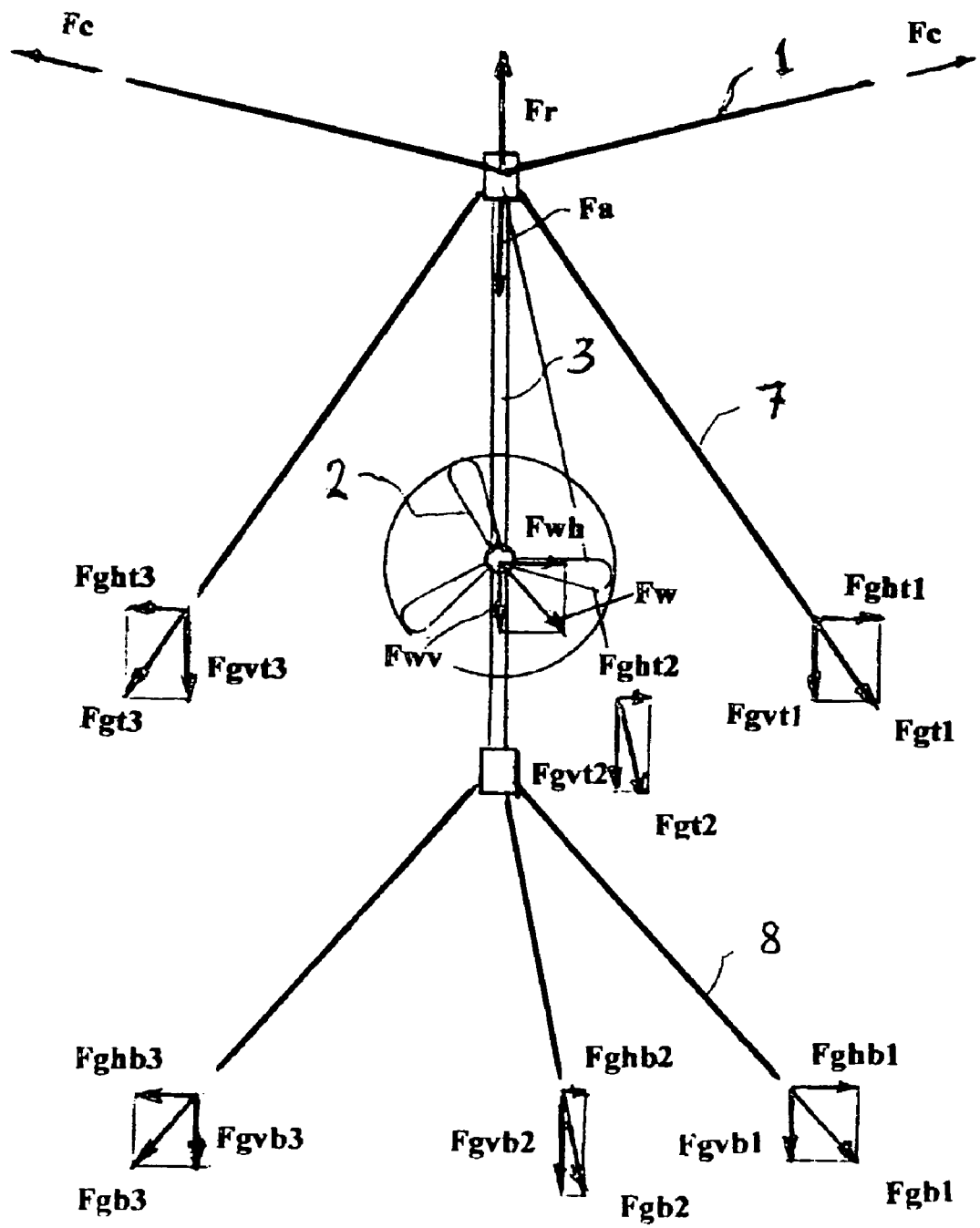
FIG. 5 is a diagram of forces applied to a system.

The forces in the structural system are schematically shown in FIG. 5.

The weight of wind turbine and its support, together with pre-tensioning force in guy ropes 7 and 8 create vertical downward load (Fa) applied to cable 1 via saddle 5. Reaction forces in cable 1 (Fc) create resultant vertical upward force Fr that balances downward vertical loads Fa. By this way cable 1 carries the vertical loads applied to the system.

As it described above, the horizontal wind load Fwh applied to turbine installation is transferred to cable 1 at the top end A of support 5 and at its bottom end B. Then, guy ropes 7 and 8 transfer these loads to footings 9 anchored in the ground. Thus, vertical reaction force Fr created by cable 1 compensates weight of structure and vertical components of forces in top (Fgvti) and bottom (Fgvbi) guy ropes. The horizontal components of forces in top (Fghti) and bottom (Fghbi) guy ropes balance the horizontal load Fwh applied to the wind turbine.

Figure 6:
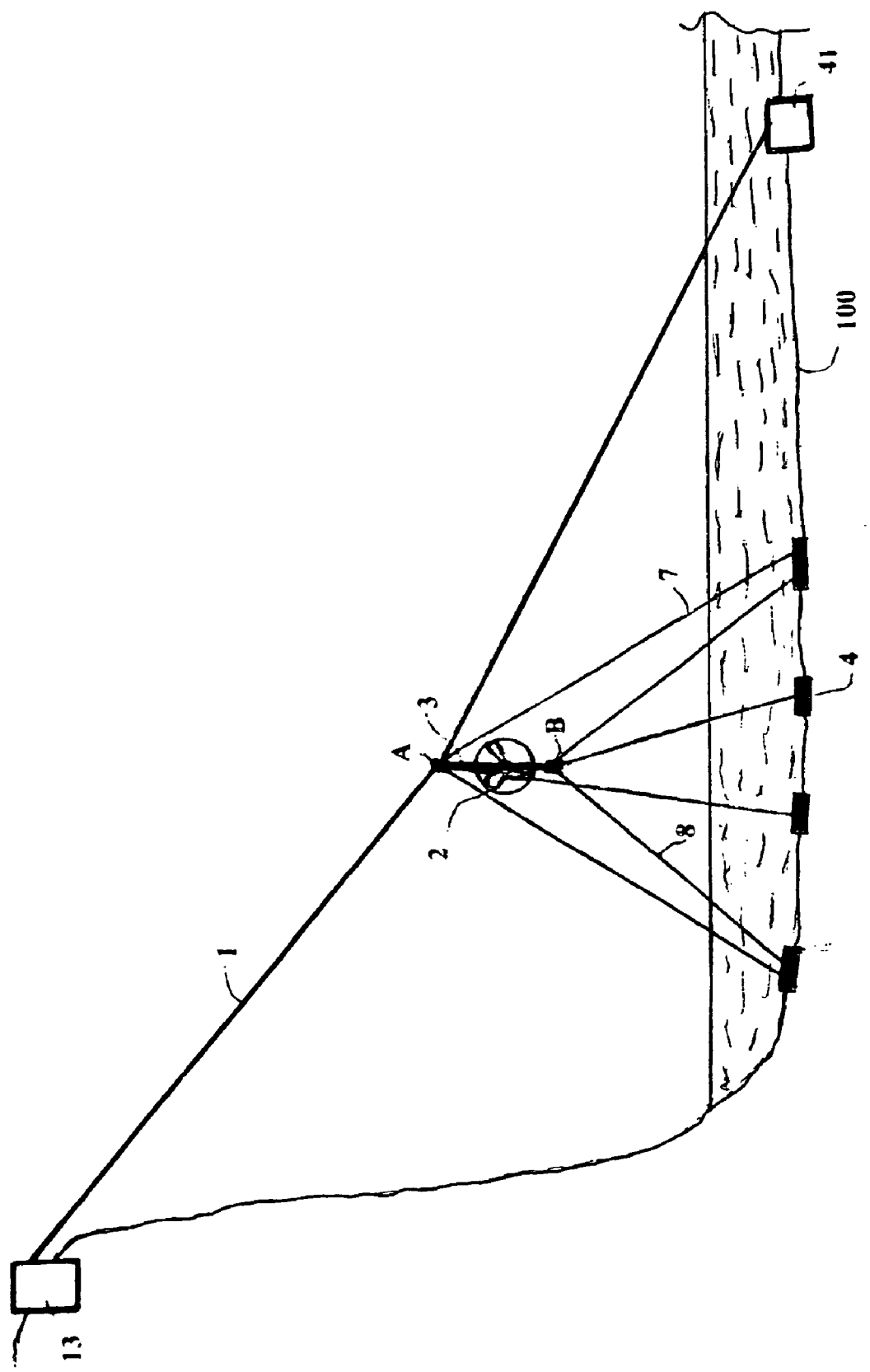
FIG. 6 is a front view of a structural system for supporting a horizontal-axis wind turbine placed highly above the sea level at seashore with cliff terrain.

The second version of the present invention disclosing installation of wind turbines placed at cliff seashore, FIG. 6. The main difference with version 1 is that one end of cable 1 is anchored in highly elevated cliff at station 13, whereas another in seabed 100, at station 41. Guy ropes 7 and 8, are anchored in seabed also. This version is one of the most prospective for wind turbine installations.

Figure 7:
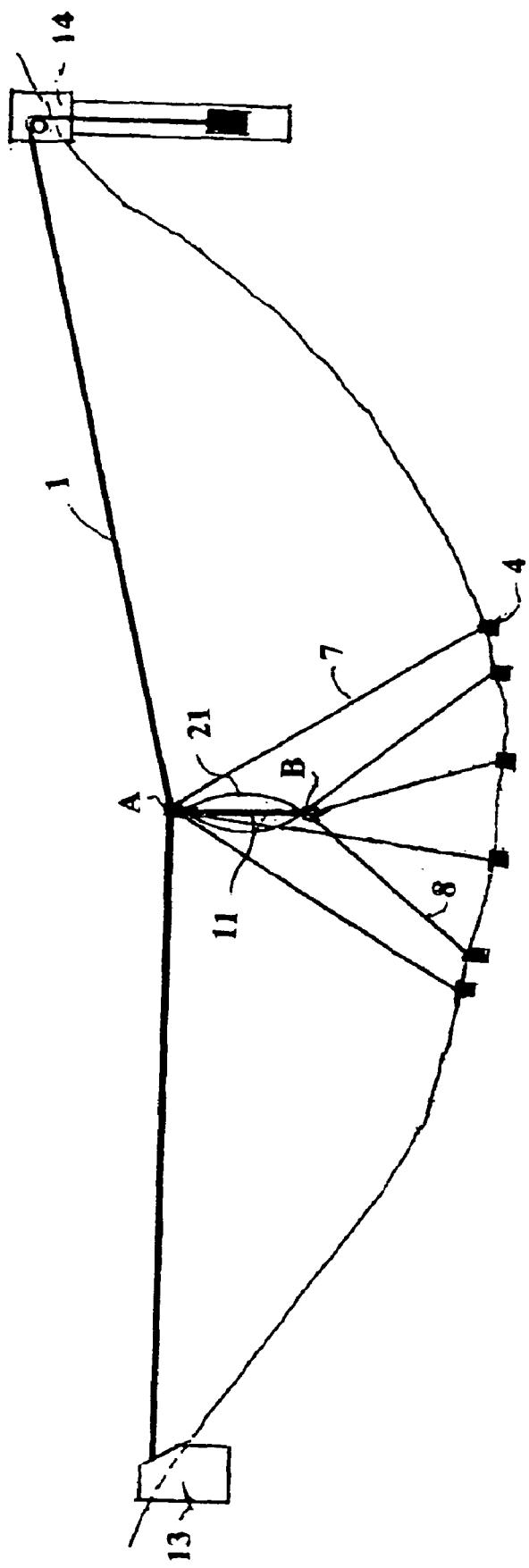
FIG. 7 is a front view of a structural system for supporting a vertical-axis wind turbine placed above the deep depression.

The third version of the present invention disclosing a support for vertical-axis wind turbines 21 placed above a ground depression, FIG. 7. Structurally, the system is similar to version 1 with main difference is that shaft 11 of the vertical-axis turbine is used also as support 3 described in the first version shown in FIG. 1. The ends A and B of shaft 11 are attached to guy ropes 7 and 8 accordingly, carrying the horizontal wind loads generated by the turbine's blades.

In the preferred embodiment erection of the system is performed by using cable 1 for transportation of equipment, materials and structural elements along cable's trace during the erection process.

As an example, erection of a system supporting single horizontal-axis wind turbine shown in FIG. 1 is schematically, step by step, described below:
1. The cable 1 is being stretched over the depression. One end 12 is attached to anchoring station 13 and the other end 11 is attached to tensioning means 15 at station 14.
2. The wind turbine 2, support 3 with saddle 5, and guy ropes 7 and 8 are assembled on special facilities placed preferably next to the upper end of the cable. Then, the turbine installation is ready for erection.
3. Saddle 5 is being hung from the cable and moved along the cable until the turbine installation reached its designed position. During the motion saddle 5 slides over the cable. As the main construction mechanism a winch is required for moving the turbine installation along the cable.
4. When the turbine reaches the designated position, guy ropes 7 and 8 are attached to previously built footings and tensioned.

The invented system gives for users the following advantages:
1) The system widely opens areas with uneven terrain for placing wind turbines.
2) The main elements of the supporting structure are tensile or tensile and flexural. It reduces the applied loads and thus, overall cost of supporting structures;
3) Being light, flexible and connected to the ground only via cable and guy ropes, the system is highly resistant to seismic loads. Even in case the guy ropes are ripped the supported turbine installation survives.
4) The carrying cable of the system can be used as transportation means for erection and maintenance of wind turbines.

This invention is not limited to the details shown since various modifications and structural changes are possible without departing in any way from the spirit of the present invention. As it is clear, the disclosed system with minor adjustments without departing from the spirit of the present invention can be used for various applications, different from wind turbines. The system can also be used for supporting suspended wind farms, including more then one wind turbine installations. What is desired to be protected is set forth in particular in the appended claims.

What is claimed is:
1. A supporting system for suspended installations, said installations being wind turbines, comprising:
   (a) at least one carrying cable stretched over the ground,
   (b) said wind turbine installation, including a wind turbine and a support for wind turbine, suspended from said cable;
   (c) a means coupling said support and said wind turbine, providing rotation of said wind turbine about said support depending on change in direction of the winds captured by said turbine;
   (d) said support for wind turbine having a means for hanging said support from said cable;
   (e) the first set of guy ropes placed at angle with each other, which top ends are attached to said cable or at a top end of said support for wind turbine, which bottom ends are attached to footing structures providing anchoring of said guy ropes;
   (f) the second set of guy ropes placed at angle with each other, which top ends are attached at the bottom end of said wind turbine installation, and which bottom ends are attached to footing structures providing anchoring of said guy ropes;
   (g) said first and said second sets of guy ropes that are pre-tensioned;
   (h) said cable capable to generate upward vertical reaction force of magnitude great enough for carrying downward vertical loads applied to said wind turbine installation.

2. A supporting system for suspended installations according of claim 1, wherein said cable has one end anchored and another end attached to a means for tensioning said cable.

3. A supporting system for suspended installations of claim 1, wherein said cable have both ends anchored.

4. A supporting system for suspended installations of claim 1, wherein said wind turbine is of a horizontal-axis type, wherein said means for hanging said wind turbine installation from said cable is a saddle placed upon the cable, capable to transfer vertical loads applied to the support for wind turbine to said carrying cable, capable to move along said cable.

5. A supporting system for suspended installations of claim 4, wherein position of said wind turbine along said support for wind turbine avoids interference of said turbine with said cable and said guy ropes when the turbine rotates about said support for wind turbine.

6. A supporting system for suspended installations of claim 1, wherein said wind turbine is of a vertical-axis type, wherein said support for wind turbine is a vertically placed shaft of said turbine.

7. A supporting system for suspended installations of claim 6, wherein said shaft has a means at one of its ends for hanging said shaft from said cable.

8. A supporting system for suspended installations of claim 7, wherein said shaft has a means for attachment of said first and said second sets of guy ropes to said shaft.

9. A supporting system for suspended installations of claim 1, including more then one wind turbine installations suspended from said carrying cable stretched over the ground.

* * * * *